Aug. 18, 1931.   S. B. HENDRICKS   1,819,292
DISK PLOW
Original Filed July 23, 1927
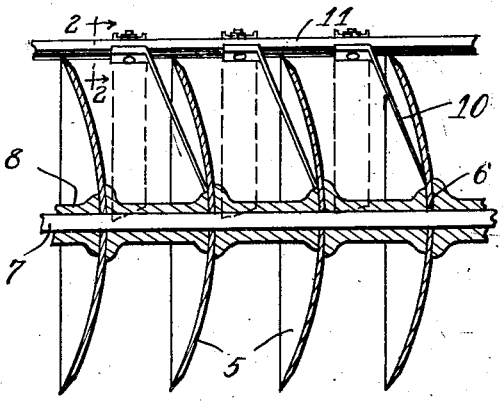
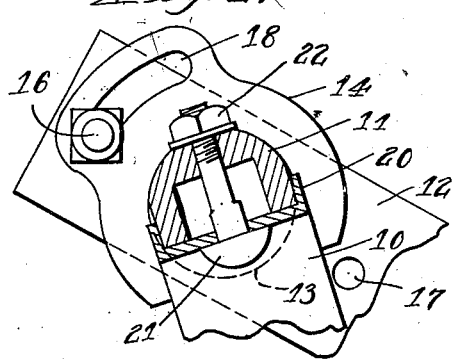
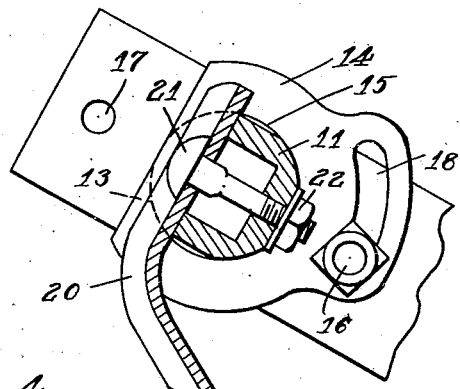
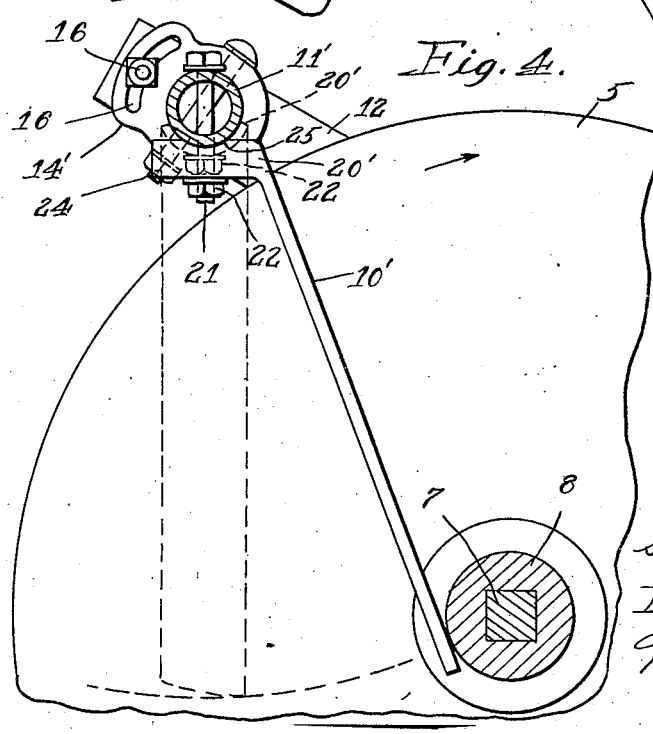
Inventor:
Simeon B. Hendricks
By
Wilson & McCanna
Attys.

Patented Aug. 18, 1931

1,819,292

UNITED STATES PATENT OFFICE

SIMEON B. HENDRICKS, OF ROCKFORD, ILLINOIS, ASSIGNOR, BY MESNE ASSIGNMENTS, TO J. I. CASE COMPANY, OF RACINE, WISCONSIN, A CORPORATION OF WISCONSIN

DISK PLOW

Original application filed July 23, 1927, Serial No. 207,911. Divided and this application filed May 31, 1928. Serial No. 281,667.

This invention relates to disk plows and is, in part, a division of my application, Serial No. 207,911, filed July 23, 1927.

The principal object of the present invention lies in the provision of combination scrapers and trash guards to adapt a disk plow to practically any kind of plowing apt to be encountered. The blades employed in accordance with my invention are mounted on a longitudinal bar supported in parallelism with the gang of plow disks and are arranged to be disposed in either one of two positions accordingly as it is desired to use the same as scrapers or trash guards; in the first case, the blades are disposed in line with the longitudinal bar so as to bear against the sides of the plow disks, and in the other case they are disposed transversely with respect to the longitudinal bar so as to stand in an intermediate position between the plow disks to prevent the choking of the disks with trash.

The invention is fully illustrated in the accompanying drawings, wherein—

Figure 1 is a fragmentary front view of a part of a gang of plow disks showing my improved combination scraper and trash guard blade in full lines in scraping position and in dotted lines in guarding position;

Figs. 2 and 3 are enlarged sectional details of the blade mounting taken on the line 2—2 of Fig. 1, Fig. 2 showing the blade in scraping position, and Fig. 3 showing the blade in guarding position; and Fig. 4 is a transverse section through a gang of plow disks showing a slightly modified form of blade and mounting therefor.

Similar reference numerals are applied to corresponding parts throughout the views.

The plow in connection with which the present improvements are utilized is of a heavy duty type, the construction of which is fully disclosed in the parent application above referred to. Only so much of the construction is shown herein as is requisite for an understanding of the present invention. The plow disks shown at 5 are preferably provided in a gang of two separately assembled sections, as disclosed in the parent application, but for the present purpose these disks may be regarded as forming a part of a single unit gang since they are arranged for operation in unison. All of the disks are provided with square center holes 6 to fit on the square shaft 7 with spacing spools 8, one of which is disposed between each pair of successive disks. The gang of plow disks is mounted on the frame so as to be drawn at an angle to the line of draft in a manner well known in this art.

The disks 5, in the case of ordinary plowing, as, for example, in breaking meadows or in oat field plowing, are arranged to be kept clean by scraping blades. For other kinds of plowing as, for example, wheat or cotton field plowing, or wherever high stubble, trash or weeds tend to wind about the disks and onto the spools therebetween and choke the same, the disks have to be guarded if the operation of the plow is to be efficient. In some instances, scraping blades and guards are both required at the same time, but that is rarely necessary. According to the present invention I have, therefore, provided blades 10 for the disks 5, at least one for each disk, arranged when set in one position to serve as scrapers and when set in another position to serve as guards. In Figs. 1 and 2 the blades 10 are shown in position bearing against the sides of the disks 5 to act as scrapers, whereas in Fig. 3 the blade is shown in the guard position, the guard position being likewise indicated in dotted lines in Fig. 1. When serving as guards the blades are disposed between adjoining disks. The blades are mounted on a longitudinal bar 11 suitably supported on the frame of the plow, as, for example, by arms, one of which appears at 12. The bar 11 is disposed above and to the rear of the gang of plow disks and extends lengthwise with respect to the gang, the same being true of the bar 11' shown in the modified or alternative form illustrated in Fig. 4. The bar 11 is channel-shaped in cross-section, as clearly appears in Figs. 2 and 3, and is arranged for rotation in circular openings 13 provided in the arms 12. A bracket 14, having an opening 15 therein conforming to the section of the bar 11, is received on the bar and is arranged to be fastened to the arm 12 by a bolt 16 in either one of the two positions shown in Figs. 2 and 3, the bolt 16 being received in either one of the openings 17 provided in the arm 12 and in an arcuate slot 18 provided in the bracket 14. The purpose for the slot 18 will presently appear. When the bar 11 is in the position shown in Fig. 2, that is, with the longitudinal flanges thereof directed inwardly toward the disks 5, the blades 10 are arranged to be secured thereto with their channel-shaped offset ends 20 fitting over the bar 11 in longitudinal alignment therewith so that when the bolts 21 passing through the offset end portions of the blades 10 and through the bar 11 are secured by the tightening of the nuts 22, the blades are held against turning with reference to the bar and will remain in the proper position with respect to the plow disks against the sides of which the blades are arranged to bear in the manner indicated in full lines in Fig. 1. At this point, it will be apparent that some slight adjustments of the blades 10 may be desired to perform the scraping operation efficiently. For this reason, I prefer to provide the arcuate slot 18 in the bracket 14. When the bolt 16 is loosened the bar 11 may be turned slightly to swing all of the blades 10 together with reference to the plow disks. When the proper position is reached the bolt 16 can be tightened to keep the desired adjustment. If, however, the blades 10 are to be used as guards the bar 11 is turned from the position shown in Fig. 2 to that shown in Fig. 3 and is secured in the latter position by the passing of the bolt 16 through the other hole 17 in the arm 12. This throws the longitudinal flanges of the bar 11 on the side away from the plow disks and the flat surface presented by the edges of the flanges provides a place for bolting the offset end portions of the blades to the bar, the offset end portions of the blades in this case being disposed substantially in right angular relation to the bar as clearly illustrated and as appears in dotted lines in Fig. 1. In this case, as in the other case, the slot 18 in the bracket 14 permits whatever adjustment in the position of the blades may be found necessary or desirable.

Referring now to Fig. 4 for consideration of the modified or alternative form of blade 10' and longitudinal bar 11' serving as the mounting therefor, it will be observed that the bar 11' is in the form of a pipe and that the bracket 14' is bolted or pinned thereto, as indicated at 24, to permit turning the same to different positions of angular adjustment relative to the supporting arms 12. A bolt 16 cooperates with an arcuate slot 18 to fasten the bar 11' in adjusted position similarly as in the other form. The offset end 20' of the blade 10' is struck to a trough form as appears from the dotted line position of the blade shown and will, therefore, fit snugly against the under side of the bar 11' and permit the blade to be fastened rigidly by means of the bolt 21 similarly as in the other form. The blade serves as a scraper when disposed in the dotted line position, as will be evident from the foregoing description. Angular adjustment of the blade is afforded by reason of the arcuate slot 18 provided in the bracket 14'. When the blade 10' is turned from the dotted line position to the full line position, in which the offset end 20' is disposed substantially at right angles to the bar 11', the same is arranged to serve as a trash guard. The edges of the flanges of the offset end 20' may be notched, as represented at 25, to form a seat for the bar 11' and thus facilitate positioning the blade and also prevent the turning thereof out of position when the bolt 21 is being tightened or after it has been tightened. The bar 11' is preferably turned to a position where all of the blades 10' have the free ends thereof engaging the spacers 8 between the disks 5 so that there is less strain imposed on the bolts 21, the blades being afforded ample support at both ends. It will be evident that this form of my invention presents an important advantage over the other form in that the bolts 21 need not be removed and replaced in shifting the blades from scraping position to guard position or vice versa; all that it is necessary to do is to loosen the nuts 22 enough to permit the blades to be turned from one position to the other and then retighten the same. Another point worthy of mention is that there is no necessity for more than one bolt hole 17 in the arm 12 to which the bracket 14' is arranged to be bolted, the reason for this being that the bar 11' in this form of the invention does not have to be turned completely around like the bar 11', sufficient angular adjustment is permitted by reason of the slot 18 when the blade is disposed in either of its two operative positions.

I claim:

1. In a disk plow, the combination with a gang of plow disks mounted on a frame, of a bar supported in parallelism with the gang of plow disks, a plurality of blades, one for each of the disks of the gang, and means for fastening each of said blades at a predetermined point on said bar in either one of two positions, said blades having their attaching ends so constructed whereby in one position of attachment to have the blades bear against the sides of the disks to act as scrapers, and in the other position of attachment have the blades disposed between adjoining disks in proper spaced relation thereto to serve as trash guards.

2. In a disk plow, the combination with a gang of plow disks mounted on a frame, of a single means arranged when set in one position to serve to scrape the plow disks and arranged when set in another position to serve as trash guards for the disks, said means comprising a bar extending longitudinally of the gang of disks and substantially in parallelism therewith, means for supporting said bar permitting the turning thereof from one position to another, and a plurality of blades arranged to be fastened to said bar between the plow disks, each of said blades having an offset part for attachment to the bar, the said offset parts being disposed substantially at right angles to the bar with the bar in one position when the blades serve as trash guards, and the said offset parts being arranged substantially in alignment with the bar when the bar is in its other position when the blades serve as scrapers.

3. In a disk plow, the combination with a gang of plow disks mounted on a frame, of a single means arranged when set in one position to serve to scrape the plow disks and arranged when set in another position to serve as trash guards for the disks, said means comprising a bar extending longitudinally of the gang disks and substantially in parallelism therewith, means for supporting said bar permitting the turning thereof from one position to another, means for fixing said bar in either adjusted position, and a plurality of blades arranged to be fastened to said bar between the plow disks, each of said blades having an offset part for attachment to the bar, the said offset parts being disposed substantially at right angles to the bar with the bar in one position when the blades serve as trash guards, and the said offset parts being arranged substantially in alignment with the bar when the bar is in its other position when the blades serve as scrapers.

4. In a disk plow, the combination of a gang of plow disks, and a single means arranged when set in one position to serve to scrape the plow disks and arranged when set in another position to serve as trash guards for the disks, said means comprising a bar extending longitudinally with reference to the gang of plow disks and substantially in parallelism therewith, the said bar having one side thereof flat for the purpose of attaching blades thereto, means for supporting said bar permitting the turning thereof to either one of two operative positions so that the flat side is disposed toward the plow disks in the one position and away from the plow disks in the other position, means for fixing the bar adjustably in either position, a plurality of blades arranged to be mounted on said bar adjacent the plow disks, there being at least one blade for each disk, the said blades having offset parts for attachment to the flat side of the bar, the said offset parts being disposed in longitudinal alignment with the bar against the flat side thereof when the latter is inwardly directed, in which case the blades serve as scrapers and bear against the sides of the plow disks, and the said offset parts being disposed in approximately right angular relation to the bar when the flat side thereof is away from the plow disks, in which case the blades are disposed at intermediate positions between the plow disks so as to serve as trash guards, and means for fastening said blades to the bar in either position.

5. In a disk plow, the combination of a gang of plow disks, and a single means arranged when set in one position to serve to scrape the plow disks and arranged when set in another position to serve as trash guards for the disks, said means comprising a bar extending longitudinally of the gang of plow disks and supported substantially in parallelism therewith, said bar being approximately channel-shaped in cross-section, a plurality of blades arranged to be mounted on said bar adjacent the plow disks, there being at least one blade for each disk, the blades having offset parts for attachment to the bar, the said offset parts being channel-shaped in cross-section so as to fit the bar in the one operative position of the blades with the offset parts disposed in longitudinal alignment with the bar, in which case the blades are arranged to serve as scrapers bearing against the sides of the plow disks, the said offset parts being arranged in another operative position of the blades to be disposed in approximately right angular relationship to the bar, in which case the blades are disposed in an intermediate position between the plow disks to serve as trash guards, means for fastening said blades to the bar in either position, said bar being supported for rotation on its longitudinal axis whereby to simultaneously adjust the relationship of all of the blades to all of the plow disks, and means for adjustably fixing the bar in position.

6. In a disk plow, the combination with a gang of plow disks mounted on a frame, and a plurality of blades adapted to cooperate with the plow disks to scrape them or guard the same from trash, of a single bar supported in parallelism with a gang of plow disks on said frame and adapted to serve as a support for the said blades, said blades being adjustable angularly relative to the bar to trash guard or scraping position, and said bar being arranged to be turned relative to the frame to adjust the blades to trash guard or scraping position, and means for securing said bar in adjusted position.

7. In a disk plow, the combination with a gang of plow disks mounted on a frame in spaced relation, and a plurality of blades adapted to cooperate with the plow disks to scrape them or guard the same from trash, of a single bar supported in parallelism with a gang of plow disks on said frame and adapted to serve as a support for the said blades, said blades being each adjustable relative to the bar at a point between adjoining disks to a position in a radial plane for guarding or a plane parallel to the axis of the disks for scraping and said bar being arranged to be turned relative to the frame to adjust the blades to trash guard or scraping position, and means for securing said bar in adjusted position.

8. A disk plow as set forth in claim 7 wherein the last mentioned means comprises a bracket fixed on one end of the bar adjacent the bearing for said bar in said frame, said bracket being arranged to be turned to different positions to bring the bar to different positions, and a bolt passing through the bracket part and frame part at a certain radius with respect to the bar to hold the bracket in adjusted position, the one part having an arcuate slot to receive the bolt to permit adjustment of one part relative to the other.

9. A plow as set forth in claim 7 wherein the last mentioned means comprises a bracket fixed on one end of said bar next to the bearing for said bar in said frame, said bracket being arranged to be turned from one position through approximately 180° to another position to correspondingly adjust the bar, said bracket having an arcuate slot provided therein at a certain radius with reference to the bar and said frame having bolt holes provided therein at diametrically opposed points with reference to the bar, and a bolt arranged to be inserted interchangeably through either bolt hole and through the arcuate slot in the bracket to secure the latter in adjusted position.

10. In a disk plow, the combination with a gang of plow disks mounted on a shaft, of a bar supported in parallelism with the gang of plow disks, a plurality of blades to serve as trash guards or scrapers each of said blades having an offset part for attachment to the bar angularly adjustable relative to the bar to make the blade assume a position in a radial plane for guarding or a plane parallel to the axis of the disk shaft for scraping, and means for adjusting the bar to position the blade against one side of the disk associated therewith for scraping the same or in contact with the disk shaft for acting as a trash guard.

11. In a disk plow, the combination with a gang of plow disks mounted on a frame, of a bar supported in parallelism with the gang of plow disks, a plurality of blades to serve as trash guards or scrapers, each blade having an offset end for attachment to the bar at a predetermined point between two adjoining disks, and a single bolt for fastening each of said blades by the offset end to the bar at the predetermined point in either one of two positions, for disk scraping or trash guarding, the offset end of the blade being properly formed so that in the scraping position of the blade the latter has its free end properly engaging the disk associated therewith, the blade when turned to guarding position being approximately midway between said disks and the next disk.

12. A structure as set forth in claim 11 wherein the bar is rotatably adjustable to simultaneously adjust all of the blades relative to the disks, the blades all being arranged to occupy one plane when in scraping position and another plane when in trash guarding position, and the structure including means for securing the bar in adjusted position.

13. In a disk plow, the combination with a gang of plow disks mounted on a frame, of a bar supported in parallelism with the gang of plow disks, a plurality of blades to serve as trash guards or disk scrapers, each of said blades having an offset part for attachment to the bar, and means at a predetermined point on the bar for fastening each of said blades to the bar by its offset part with the offset part parallel to the bar or disposed in transverse relation thereto, for scraping or trash guarding, respectively, the point of attachment on the bar being spaced with relation to the disk associated with the blade and the angularity of the offset part of the blade being such that when the offset part is fastened in parallelism with the bar the blade has scraping contact with the disk and when the offset part is fastened to the bar in transverse relation thereto the blade is disposed approximately midway between the aforesaid disk and the next disk, said bar being rotatably adjustable to simultaneously adjust all of the blades relative to the disks, the blades all being arranged to occupy one plane when in scraping position and another plane when in trash guarding position, and means for securing the bar in adjusted position.

14. In a disk plow, the combination of a gang of plow disks, and a single means arranged when set in one position to serve to scrape the plow disks and arranged when set in another position to serve as trash guards for the disks, said means comprising a bar extending longitudinally of the gang of plow disks and supported substantially in parallelism therewith, said bar being approximately channel-shaped in cross-section, a plurality of blades arranged to be mounted on said bar adjacent the plow disks, there being at least one blade for each disk, the blades having offset parts for attachment to the bar, the said offset parts being formed so as to interfit with the channel cross-section of the bar when the offset parts are disposed in longitudinal alignment with the bar, in which case the blades are arranged to serve as scrapers bearing against the sides of the plow disks, the said offset parts being arranged in another operative position of the blades to be disposed in approximately right angular relationship to the bar, in which case the blades are disposed in an intermediate position between the plow disks to serve as trash guards, and means for fastening the blades to the bar.

15. In a disk plow, the combination with a gang of plow disks mounted on a frame, of a bar supported in parallelism with the gang of plow disks, a plurality of blades to serve as trash guards or scrapers, each of said blades having an offset part for attachment to the bar, the offset part being provided with one portion arranged to fit on the bar when the offset part is in alignment therewith and another portion arranged to fit on the bar when the offset part is at right angles thereto, for fastening the offset parts of said blades to the bar.

In witness of the foregoing I affix my signature.

SIMEON B. HENDRICKS.

CERTIFICATE OF CORRECTION.

Patent No. 1,819,292.                    Granted August 18, 1931, to

SIMEON B. HENDRICKS.

It is hereby certified that error appears in the printed specification of the above numbered patent requiring correction as follows: Page 3, line 24, claim 3, after the word "gang" insert the word of; page 5, line 17, claim 15, before the word "for" insert the words and means; and that the said Letters Patent should be read with these corrections therein that the same may conform to the record of the case in the Patent Office.

Signed and sealed this 6th day of October, A. D. 1931.

(Seal)                                                  M. J. Moore,
                                                   Acting Commissioner of Patents.